United States Patent
Wieczorek

(10) Patent No.: US 9,689,380 B2
(45) Date of Patent: Jun. 27, 2017

(54) SHAPE MEMORY ACTUATOR DEVICE FOR A REARVIEW DEVICE OF A MOTOR VEHICLE WITH REDUCED COOLING TIMES

(71) Applicant: SMR Patents S.à.r.l., Luxembourg (LU)

(72) Inventor: Romeo Wieczorek, Esslingen (DE)

(73) Assignee: SMR PATENTS S.À.R.L., Luxembourg (LU)

( * ) Notice: Subject to any disclaimer, the term of this patent is extended or adjusted under 35 U.S.C. 154(b) by 0 days.

(21) Appl. No.: 15/165,417

(22) Filed: May 26, 2016

(65) Prior Publication Data

US 2016/0347252 A1 Dec. 1, 2016

(30) Foreign Application Priority Data

May 29, 2015 (EP) .................................... 15169980

(51) Int. Cl.
*F03G 7/06* (2006.01)
*B60R 1/07* (2006.01)
(Continued)

(52) U.S. Cl.
CPC ................ *F03G 7/065* (2013.01); *B60R 1/00* (2013.01); *B60R 1/02* (2013.01); *B60R 1/04* (2013.01);
(Continued)

(58) Field of Classification Search
CPC ...................... F03G 7/06; F03G 7/065; H04N 5/225–5/247; B60R 1/00; B60R 1/02–1/089
(Continued)

(56) References Cited

U.S. PATENT DOCUMENTS 4,965,545 A   10/1990   Johnson
6,164,784 A * 12/2000   Butera ................... B60R 1/087
                                                   359/603
(Continued)

FOREIGN PATENT DOCUMENTS

DE   102005059081 A1   2/2007
DE   102013221336 A1   4/2015
EP       2781743 A1   9/2014

OTHER PUBLICATIONS

European Search Report, dated Jul. 20, 2015 and English translation.

*Primary Examiner* — Mark Laurenzi
*Assistant Examiner* — Xiaoting Hu
(74) *Attorney, Agent, or Firm* — MacMillan, Sobanski & Todd, LLC

(57) ABSTRACT

An actuator device for a rearview device of a motor vehicle includes at least one retaining element, at least one adjusting element, at least one driving means, and at least one heat-conducting means. The adjusting element is configured to be transferred into a plurality of functional positions, in particular from a basic position into at least one end position. The driving means includes at least one shape-memory element in the form of a wire, extending between the retaining element and the adjusting element and configured to be secured to both. Extension of the shape-memory element can be modified when electrically energized. The adjusting element can be transferred from one functional position into another functional position by modifying the extension. The heat-conducting means lies in contact with the driving means at least in the end position of the adjusting element. At least one switching means provides no contact between the driving means and the heat-conducting means in the basic position of the adjusting element and causes (Continued)

contact between the driving means and the heat-conducting means.

19 Claims, 2 Drawing Sheets

(51) Int. Cl.
    *B60R 1/02*     (2006.01)
    *B60R 1/00*     (2006.01)
    *B60R 1/04*     (2006.01)
    *H04N 5/225*     (2006.01)
    *B60R 1/12*     (2006.01)

(52) U.S. Cl.
    CPC ............... *B60R 1/07* (2013.01); *H04N 5/225* (2013.01); *B60R 2001/1253* (2013.01)

(58) Field of Classification Search
    USPC .................................... 60/528; 310/306, 307
    See application file for complete search history.

(56) References Cited

U.S. PATENT DOCUMENTS

| | | | | |
|---|---|---|---|---|
| 6,364,496 B1* | 4/2002 | Boddy | ..................... | B60R 1/072 248/476 |
| 8,281,585 B2* | 10/2012 | Gao | ........................ | F03G 7/065 60/527 |
| 2003/0000605 A1* | 1/2003 | Homma | .................. | F03G 7/065 148/563 |
| 2006/0268439 A1* | 11/2006 | Butera | .................... | B60R 1/072 359/841 |
| 2010/0236236 A1* | 9/2010 | Mankame | ............... | F03G 7/065 60/527 |
| 2011/0083431 A1* | 4/2011 | Mankame | ............... | F03G 7/065 60/527 |
| 2011/0120119 A1* | 5/2011 | Alexander | ................ | F02G 5/04 60/527 |
| 2011/0222176 A1* | 9/2011 | Browne | .................. | B60R 1/072 359/846 |
| 2011/0296826 A1* | 12/2011 | Pinto, IV | ................ | F03G 7/065 60/527 |
| 2012/0048839 A1* | 3/2012 | Leary | ...................... | F03G 7/065 219/200 |
| 2012/0234000 A1* | 9/2012 | Browne | .................. | F03G 7/065 60/527 |
| 2013/0145760 A1* | 6/2013 | Gondo | .................... | F03G 7/065 60/528 |
| 2014/0210219 A1* | 7/2014 | Pipp | ....................... | F03G 7/065 292/144 |
| 2014/0211010 A1* | 7/2014 | Alexander | ................ | B60R 1/00 348/148 |
| 2015/0260170 A1* | 9/2015 | Alexander | .............. | F03G 7/065 318/117 |

* cited by examiner

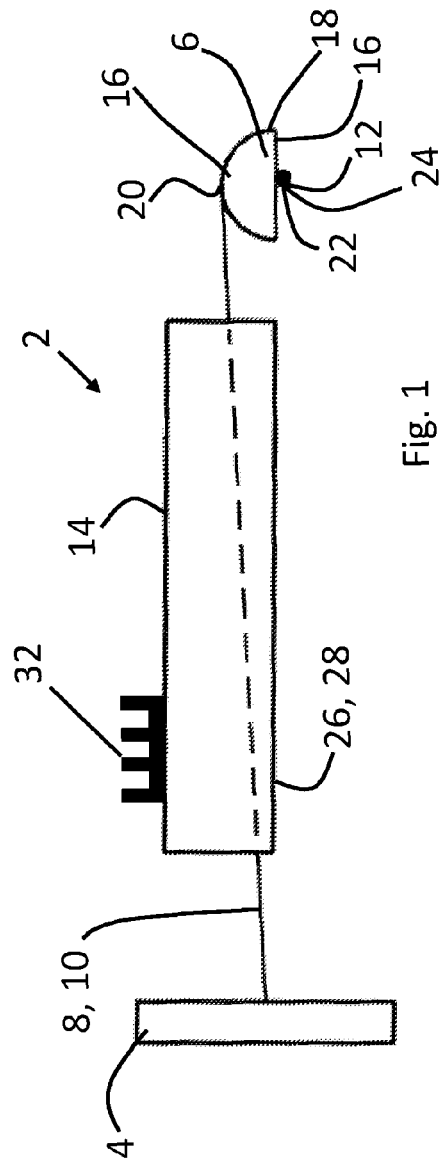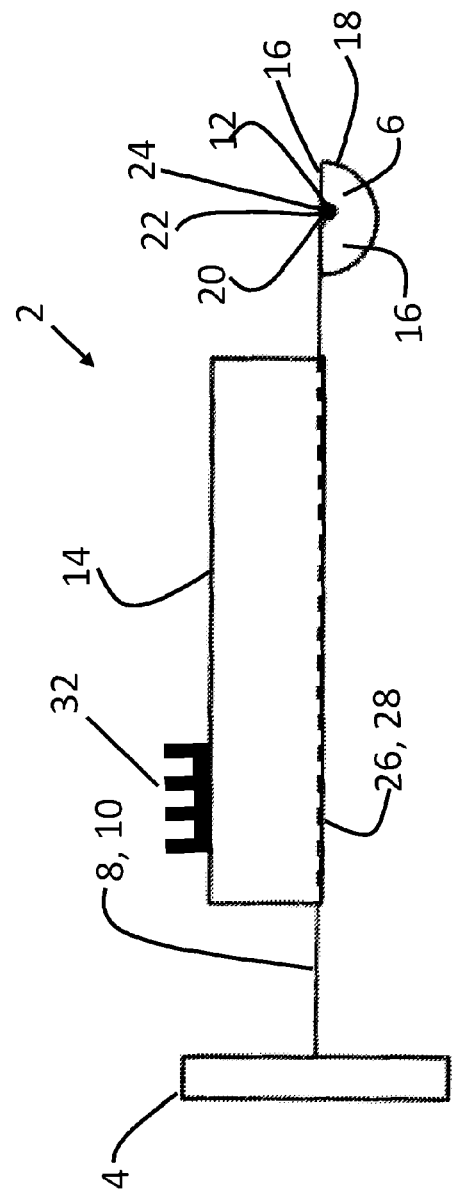

SHAPE MEMORY ACTUATOR DEVICE FOR A REARVIEW DEVICE OF A MOTOR VEHICLE WITH REDUCED COOLING TIMES

CROSS-REFERENCE TO RELATED APPLICATIONS

This application claims priority from European Patent Application No. 15169980.8, filed May 29, 2015, the disclosure of which is incorporated herein by reference.

BACKGROUND OF THE INVENTION

The invention relates to an actuator device for a rearview device of a motor vehicle comprising at least one retaining element, an adjusting element, at least one driving means, and at least one heat-conducting means. The at least one adjusting element is configured to be transferred into a plurality of functional positions, in particular from a basic position into at least one end position. The at least one driving means comprises at least one shape-memory element which is, in particular, in the form of a wire, which extends between the retaining element and the adjusting element and can be or is secured to both. The extension of said shape-memory element can be modified when actuated, in particular when electrically energized. The at least one adjusting element can be transferred from one functional position into another functional position by means of the modification of the extension. In particular, the functional positions can be transferred from the basic position into the end position or vice versa. The at least one heat-conducting means lies in contact with the driving means at least in the end position of the adjusting element. In addition, the invention relates to a rearview device having such an actuator device and a motor vehicle having such a rearview device and/or having such an actuator device.

A non-generic actuator device in which the driving means consists of a shape-memory element is known from EP 2 781 743 A1.

In the case of actuator devices having driving means which comprise a shape-memory element, energizing of the driving means results in a shortening of the shape-memory element. By securing the driving means to a stationary retaining element and a movable adjusting element, the adjusting element is moved, in particular rotated, by shortening the driving means, as a result of which an exterior rearview mirror can be transferred from a folded-in position into a folded-out position.

In order to be able to expand a shape-memory element again following the shortening thereof, i.e. following the energization thereof, the shape-memory element has to cool down. The known method for reducing the cooling time is encasing the driving element at least in sections with silicone, which stores the heat of the driving element capacitively. A disadvantage of this method has proven to be the fact that the amount of heat which can be absorbed by the silicone, if the actuator device is operated repeatedly within brief intervals of time, is not sufficient to continue to achieve a cooling effect.

It is therefore the object of one embodiment example of the invention to propose an actuator device, for which the cooling times of the driving means can be reduced.

SUMMARY OF THE INVENTION

The invention relates to an actuator device for a rearview device of a motor vehicle comprising at least one retaining element, an adjusting element, at least one driving means, and at least one heat-conducting means. The at least one adjusting element is configured to be transferred into a plurality of functional positions, in particular from a basic position into at least one end position. The at least one driving means comprises at least one shape-memory element which is, in particular, in the form of a wire, which extends between the retaining element and the adjusting element and can be or is secured to both. The extension of said shape-memory element can be modified when actuated, in particular when electrically energized. The at least one adjusting element can be transferred from one functional position into another functional position by means of the modification of the extension. In particular, the functional positions can be transferred from the basic position into the end position or vice versa. The at least one heat-conducting means lies in contact with the driving means at least in the end position of the adjusting element. In addition, the invention relates to a rearview device having such an actuator device and a motor vehicle having such a rearview device and/or having such an actuator device.

To reduce cooling times of the driving means, in the case of an actuator device as indicated above, in that at least one switching means is provided, by means of which the at least one driving means and the at least one heat-conducting means can be or are arranged with respect to one another with no contact in the basic position of the adjusting element, and/or by means of which the at least one driving means and the at least one heat-conducting means can be or are arranged touching one another at least in sections, at least in the end position of the adjusting element.

As a result of the fact that the actuator device comprises a switching means, by means of which the driving means and the heat-conducting means are arranged with respect to one another with no contact in the basic position of the adjusting element and by means of which the driving means and the heat-conducting means touch one another, if the adjusting element is arranged in the end position, the heat generated due to the energization of the driving means can be conducted away inside the driving element by means of the heat-conducting means.

The fact that the driving means and heat-conducting means touch each other in the end position of the adjusting means guarantees that the driving means sufficiently alters its length, before it releases the heat required to alter the length to the heat-conducting means.

The actuator device can, in principle, be an assembly of any vehicle component, in which an adjusting element is to be transferred from one functional position into another functional position. The adjusting element can hereby be used, directly or indirectly, to modify the position of a component relative to another component, for example to fold in and/or fold out components and to open openings which are or can be sealed by the component.

It is in principle conceivable that the adjusting element can be arranged in a plurality of functional positions. The basic position and the end position can constitute edge areas, between which the plurality of functional positions is arranged.

It is conceivable that the heat-conducting means is substantially stationary and the driving means can be moved transversely to its extension between the retaining element and the adjusting element by the switching means, or that the driving means is substantially stationary and the heat-conducting means can be moved transversely or obliquely to the extension of the driving means between the retaining element and the adjusting element by the switching means. In addition, it is conceivable that both the driving means and the heat-conducting means can be moved. If, however, either the driving means or the heat-conducting means can be moved and the other means respectively is stationary, this facilitates the design of the switching element and the arrangement of the individual components.

It is in principle conceivable that the switching means and the adjusting element comprise separate components and/or components which can be separated from one another and, in each case, comprise their own kinematics which are independent of the kinematics of the other component respectively. The actuator device can, however, be produced simply and inexpensively, if the switching means and the adjusting element comprise joint kinematics and a transfer of the adjusting element from the basic position into the end position automatically comprises a transfer from an arrangement of the driving means and heat-conducting means with no contact into an arrangement of the driving means and heat-conducting means in which they touch one another.

The actuator device can be further simplified, in a further embodiment example, in that the switching element and the adjusting element comprise a joint component, in particular that the switching element comprises a shaping of a surface section of the adjusting element, by means of which the driving means and/or the heat-conducting means, on transferring the adjusting element from the basic position into the end position lying in contact with a point of contact of the surface section, which can be modified by transferring the adjusting element, can be moved transversely or obliquely to the extension of the driving means between the retaining element and the adjusting element in the direction of the heat-conducting means or driving means.

The term 'point of contact which can be modified by transferring the adjusting element' is used below to denote a point with which the driving means and/or the heat-conducting means initially lie(s) in contact. The point with which the driving means and the heat-conducting means initially lie in contact can be modified by transferring the adjusting element from the basic position into the end position.

As a result, the number of the individual components of the actuator device can also be further reduced, simplifying the assembly of the actuator device.

It is in principle conceivable that the transfer of the adjusting element from the basic position into the end position can take place using any form of movement, for example by means of a linear movement. In a further development of the latter embodiment, it does however prove to be advantageous, if the adjusting element on modifying the extension of the at least one driving means can be transferred from the basic position into the end position by being rotated about an axis of rotation and/or that on rotating the adjusting element about the axis of rotation the distance between the axis of rotation and the point of contact of the surface section, which can be modified by transferring the adjusting element, can be modified.

In particular if the driving means is configured in the form of a wire, it proves to be advantageous if the at least one driving means can be secured to the surface section of the adjusting element by a securing element and/or if the at least one driving means extensively lies in contact with the surface section between the point of contact which can be modified by transferring the adjusting element and the securing element.

The contour of the surface section can, in principle, take any form. The desired technical effect, namely the approaching one another of the driving means and heat-conducting means on transferring the adjusting element from the basic position into the end position can, however, be simply achieved, if the surface section of the adjusting element is formed by an external contour which is rounded, in particular circular, oval or sinusoidal, at least in sections, and/or by an external contour which is straight at least in sections.

It is in principle conceivable that the actuator device comprises a plurality of driving means, wherein for example a second driving means returns the adjusting device to the basic position. In one embodiment of the actuator device a return means is provided which biases the adjusting element into the basic position. The return means can, for example, be a spring, for example a torsion spring or the like.

The heat-conducting means can, in principle, comprise any contour, as long as it is guaranteed that the driving means and heat-conducting means do not touch in the basic position of the adjusting element and do touch each other in the end position of the adjusting element. It also proves to be advantageous, if the heat-conducting means comprises a continuous recess which extends substantially parallel to the driving means, inside which recess the driving means is arranged extending between the retaining element and the adjusting element and with the inner surface of which the driving means lies in contact in the end position of the adjusting element and/or that the heat-conducting means is configured in a strip or plate form and with the external surface of which the driving means lies in contact in the end position of the adjusting element.

If the heat conducting means comprises a continuous recess, the driving means can comprise, for example, a cylindrical sleeve.

In order to prevent a short-circuit occurring between the driving means and the heat-conducting means in the end position of the rotating element, for example if the heat-conducting means comprises a metal, it proves to be advantageous if the actuator device comprises at least one electrically insulating and thermally conducting insulating element arranged between the driving means and the heat-conducting means.

In addition, in another embodiment of the actuator device, at least one cooling element which lies directly in contact with the driving means and which at least virtually encloses the driving means in its entirety is provided. If the cooling element comprises, for example, a plastic, in particular silicon, the insulating element can be formed by the cooling element.

In addition, the actuator device can comprise at least one cooling rib which can be or is thermally connected to the heat-conducting means, by means of which cooling rib heat can be released into the surroundings by convection and/or by forced convection, for example by being flowed around by the head wind.

If the actuator device is provided in an exterior rearview mirror, for example, the at least one cooling rib can be formed by an aerodynamically effective contour arranged on the external surface of the exterior mirror.

It proves to be advantageous if the heat-conducting means, the cooling element and/or the at least one cooling rib comprises a plastic, in particular silicon, and/or a metal, in particular copper or iron.

In addition, the object is achieved by a rearview device, such as an interior mirror or exterior mirror or camera, for a motor vehicle having at least one actuator device with at least one of the features indicated previously.

Finally, the object is achieved by a motor vehicle having at least one rearview device, such as an interior mirror or exterior mirror or camera, and at least one of the features indicated previously and/or having at least one actuator device with at least one of the features indicated previously.

The actuator device according to the invention, the rearview device according to the invention as well as the motor vehicle according to the invention prove to be advantageous in many respects:

The fact that the driving means is connected to a heat-conducting means in an end position of the adjusting element means that a large quantity of heat present in the driving means can be quickly and easily released to the heat-conducting means. As a result of this, a temperature which allows the shape-memory element to expand is quickly reached inside the driving means again.

Various aspects of this invention will become apparent to those skilled in the art from the following detailed description of the preferred embodiment, when read in light of the accompanying drawings.

BRIEF DESCRIPTION OF THE DRAWINGS

FIG. 1 shows a schematic side view of an embodiment example of the actuator device in the basic position of an adjusting element.

FIG. 2 shows a schematic side view of the embodiment example according to FIG. 1 in the end position of the adjusting element.

DETAILED DESCRIPTION OF THE PREFERRED EMBODIMENTS

Figure 3:
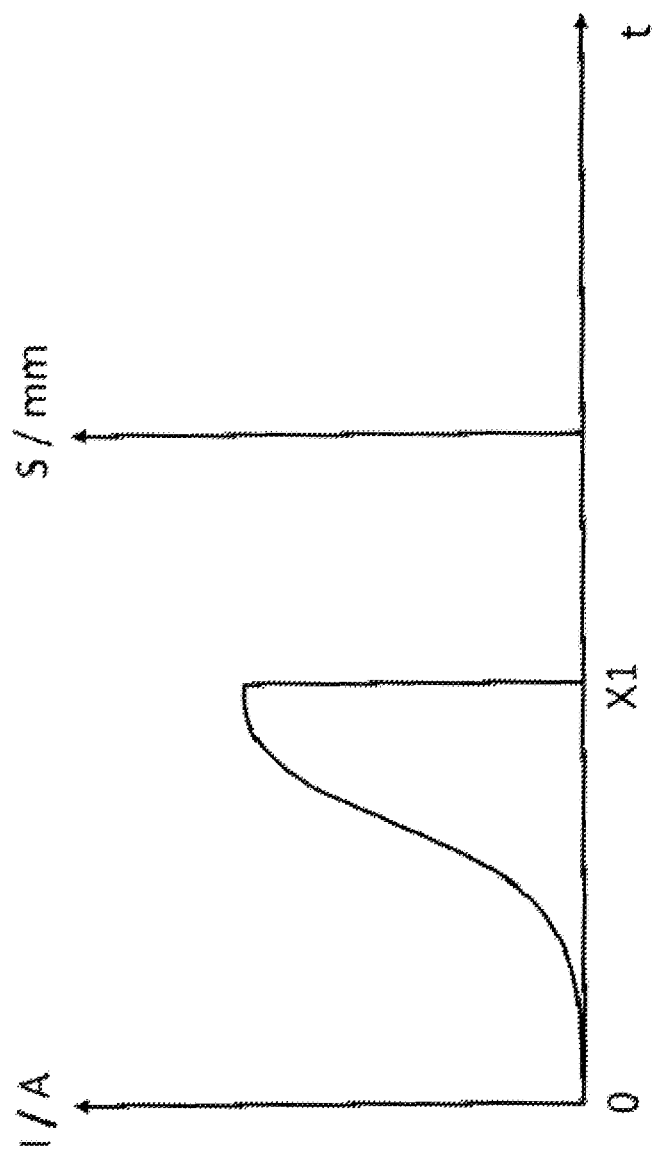
FIG. 3 shows a diagrammatic representation of a movement of a driving means in the direction of a heat-conducting means as a function of the time and current intensity.

FIGS. 1 and 2 show a schematic view of an actuator device designated in its entirety with the reference numeral 2 for a rearview device of a motor vehicle. The actuator device 2 comprises a retaining element 4 and an adjusting element 6. The adjusting element 6 can be transferred into a plurality of functional positions. The adjusting element 6 is located in a basic position in FIG. 1. The adjusting element 6 is located in an end position in FIG. 2. A driving means 8 is arranged between the retaining element 4 and the adjusting element 6, said driving means 8 being formed by a shape-memory element 10 in the form of a wire. The driving means 8 is not actuated in FIG. 1 and is actuated in FIG. 2. The driving means 8 is actuated by being energized, as a result of which the driving means 8 is shortened with respect to its extension between the retaining element 4 and the adjusting element 6, resulting in the adjusting element 6 being rotated about an axis of rotation 12.

In addition, the actuator device 2 comprises a heat-conducting means 14. The heat-conducting means 14 and the driving means 8 are arranged with respect to one another such that they extend with respect to one another with no contact in the basic position of the adjusting element 6 (FIG. 1) and extend touching each other at least in sections in the end position of the adjusting element 6 (FIG. 2). This makes it possible for heat to be transferred from the driving means 8 to the heat-conducting means 14 in the end position of the adjusting element 6. In order to hold the driving means 8 and the heat-conducting means 14 at a distance from one another in the basic position, the actuator device 2 comprises a switching means 16.

In the case of the embodiment examples shown in the figures, the heat-conducting means 14 is secured in a stationary position, whereas the driving means 8 formed by a shape-memory element 10 in the form of a wire is moved by the switching means 16 on transferring the adjusting element 6 from the basic position into the end position in the direction of the heat-conducting means 14.

In addition, in the case of the embodiment example shown in FIGS. 1 and 2, the switching means 16 is configured as a joint component with the adjusting element 6 and comprises a shaping of a surface section 18 of the adjusting element 6. The shaping of the surface section 18 initially consists of a rounded section and an adjoining straight section of the external contour.

The mode of operation of the actuator device 2 is described below. In the basic position of the adjusting element 6 according to FIG. 1 the driving means 8 is extended between the retaining element 4 and the adjusting element 6. The driving means 8 initially lies in contact with a point of contact 20 on the surface section 18 of the adjusting element 6, which point of contact can be modified by transferring the adjusting element 6, and during the further course of its travel, extensively lies in contact with the surface section 18 until it is secured by a securing element 22 to the adjusting element 6. On actuating the driving means 8, i.e. on energizing the driving means 8, the driving means 8 heats up, shortening its length. Due to the securing of the driving means 8 by the securing element 22 to the adjusting element 6, the adjusting element 6 is rotated about the axis of rotation 12 when the driving means 6 is shortened.

As a result of the external contour of the surface section 18 the driving means 8 is moved transversely or obliquely to the extension of the driving means 8 between the retaining element 4 and the adjusting element 6. On reaching the end position of the adjusting element 6, as shown in FIG. 2, the point of contact 20 of the surface section 18 of the adjusting element 6 is located at such a level that the driving means 8 and the heat-conducting means 14 touch each other. In the arrangement shown in FIG. 2, heat from the driving means 8 can be transferred to the heat-conducting means 14. Also shown in the FIGS. 1 and 2 is a return means 24 which biases the adjusting element 6 into the basic position. It is also shown that the driving means 8 extends between the retaining element 4 and the adjusting element 6. Further the heat-conducting means 14 comprises a continuous recess 26 provided within the inner surface of the bottom part of the heat-conducting means 14, whereby the recess 26 extends substantially parallel to the driving means 8. In this way it is achieved that on the one hand the driving means 8 is arranged within the recess 26 and lies in contact with the inner surface of the recess 26, hence with the heat-conducting means 14, when the adjusting element 6 is in the end position. But on the other hand the driving means 8 lies not in contact with the inner surface of the recess 26, hence with the heat-conducting means 14, when the adjusting element 6 is in the basic position. Further, an insulating and thermally conducting element 28 is arranged between the driving means 8 and the heat-conducting means 14. Also, a cooling element 30 is arranged in direct contact with the driving means 8 and at least virtually enclosing the driving means 8 in its entirety. Still further a cooling rib 32, which can be or is thermally connected to the heat-conducting means 14 is shown in the FIGS. 1 and 2.

FIG. 3 shows, schematically and diagrammatically, the energization with a current intensity I over an energization time t1 as well as the resulting, triggered movement S of the driving means 8 transversely or obliquely to the extension of the driving means 8 between the retaining element 4 and the adjusting element 6 over time t. By energizing the driving means up to time t1, the driving means 8 heats up so much that it continues to extend even after the end of the energization. A maximum deflection is reached at t2. The driving means 8 and heat-conducting means 14 touch each other, which results in a return of the deflection of the driving means 8 to position t=0. Due to the shaping of the surface section 18, the deflection of the driving means from t=0 to t2 is not linear but sinusoidal.

The claims mentioned in the preceding description as well as the features of the invention which are disclosed in the figures can be fundamental, both individually and combined in any way whatsoever, for achieving the invention in its different embodiments.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An actuator device for a rearview device of a motor vehicle comprising:
   at least one retaining element;
   at least one adjusting element which can be transferred into a plurality of functional positions comprising a basic position and at least one end position;
   at least one driving means which comprises at least one shape-memory element which is in the form of a wire and extends between the retaining element and the adjusting element and is secured to both, where the extension of said shape-memory element is modified on being actuated and by means of the modification of the extension of which the at least one adjusting element is transferred from one functional position into another functional position;
   at least one heat-conducting means which lies in contact with the driving means at least in the end position of the adjusting element; and
   at least one switching means, by means of which the at least one driving means and the at least one heat-conducting means are arranged with respect to one another with no contact in the basic position of the adjusting element and by means of which the at least one driving means and the at least one heat-conducting means are arranged touching one another at least in sections at least in the end position of the adjusting element;
   wherein the heat-conducting means is stationary and the driving means is moved transversely or obliquely to the extension of the driving means between the retaining element and the adjusting element by the switching means; and
   the switching means is configured as a joint component with the adjusting element and comprises a shaping of a surface section of the adjusting element, wherein the driving means lies in contact with a point of contact of the surface section of the adjusting element such that the driving means is positioned relative to the heat-conducting means as the adjusting element transitions from the basic position into the end position.

2. The actuator device according to claim 1, wherein the switching means and the adjusting element comprise joint kinematics and a transfer of the adjusting element from the basic position into the end position automatically comprises a transfer from a non-contact arrangement of the driving means to the heat-conducting means into an arrangement of the driving means and heat-conducting means where they touch one another.

3. The actuator device according to claim 1, wherein the driving means, on transferring the adjusting element from the basic position into the end position, is moved in the direction of the heat-conducting means by the joint component.

4. The actuator device according to claim 3, wherein the adjusting element, on modifying the extension of the at least one driving means, is transferred from the basic position into the end position by at least one of being rotated about an axis of rotation, a linear movement, and rotating the adjusting element about the axis of rotation such that the distance between the axis of rotation and the point of contact of the surface section is modified.

5. The actuator device according to claim 4, wherein the surface section of the adjusting element is formed by an external contour which is at least one of rounded and straight, at least in sections.

6. The actuator device according to claim 3, wherein the surface section of the adjusting element is formed by an external contour which is at least one of rounded and straight, at least in sections.

7. The actuator device according to claim 1, wherein the at least one driving means is configured to be at least one of secured to the surface section of the adjusting element by a securing element and positioned in contact with the surface section of the adjusting element between the point of contact and the securing element, wherein the point of contact can be modified by transferring the adjusting element and the securing element.

8. The actuator device according to claim 7, wherein the surface section of the adjusting element is formed by an external contour which is at least one of rounded and straight, at least in sections.

9. The actuator device according to claim 1, further comprising at least one return means which biases the adjusting element into the basic position.

10. The actuator device according to claim 1, wherein the heat-conducting means comprises a continuous recess which extends substantially parallel to the driving means, inside which recess the driving means is arranged extending between the retaining element and the adjusting element and with the inner surface of which the driving means lies in contact in the end position of the adjusting element.

11. The actuator device according to claim 1, further comprising at least one electrically insulating and thermally conducting element arranged between the driving means and the heat-conducting means.

12. The actuator device according to claim 1, wherein at least one cooling element lies directly in contact with the driving means and at least virtually enclosing the driving means in its entirety.

13. The actuator device according to claim 12, wherein at least one of the heat-conducting means and the cooling element comprises one of a silicon-based plastic, an iron-based metal, and a copper-based metal.

14. The actuator device according to claim 1, further comprising at least one cooling rib which is configured to be thermally connected to the heat-conducting means, by means of which cooling rib heat can be released into the surroundings by at least one of convection and forced convection.

15. The actuator device according to claim 14, wherein at least one of the heat-conducting means and the at least one cooling rib comprises one of a silicon-based plastic, an iron-based metal, and a copper-based metal.

16. The actuator device according to claim 1, wherein the heat-conducting means, comprises one of a silicon-based plastic, an iron-based metal, and a copper-based metal.

17. A rearview device configured as at least one of an interior mirror, an exterior mirror, and a camera, for a motor vehicle having at least one actuator device according to claim 1.

18. A motor vehicle having at least one rearview device configured as at least one of an interior mirror, an exterior mirror, and a camera having at least one actuator device according to claim 1.

19. The actuator device according to claim 1 wherein the heat-conducting means is configured in a strip or plate form and with the external surface of which the driving means lies in contact in the end position of the adjusting element.

* * * * *